United States Patent
Miao

(10) Patent No.: US 12,132,766 B2
(45) Date of Patent: Oct. 29, 2024

(54) INTER-AREA MEDIA SERVICE SWITCHING METHOD, SERVER, SYSTEM, AND STORAGE MEDIUM

(71) Applicant: ZTE CORPORATION, Guangdong (CN)

(72) Inventor: Chuanyang Miao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 364 days.

(21) Appl. No.: 17/623,295

(22) PCT Filed: Jun. 3, 2020

(86) PCT No.: PCT/CN2020/094069
§ 371 (c)(1),
(2) Date: Dec. 28, 2021

(87) PCT Pub. No.: WO2020/259234
PCT Pub. Date: Dec. 30, 2020

(65) Prior Publication Data
US 2022/0368730 A1    Nov. 17, 2022

(30) Foreign Application Priority Data

Jun. 28, 2019   (CN) .......................... 201910574487.7

(51) Int. Cl.
*H04L 65/1069* (2022.01)
*H04L 67/1021* (2022.01)
(Continued)

(52) U.S. Cl.
CPC ...... *H04L 65/1069* (2013.01); *H04L 67/1021* (2013.01); *H04W 36/32* (2013.01); *H04W 76/10* (2018.02)

(58) Field of Classification Search
CPC .......... H04L 65/1069; H04L 67/1021; H04W 76/10; H04W 36/32
(Continued)

(56) References Cited

U.S. PATENT DOCUMENTS

| | | | |
|---|---|---|---|
| 2018/0041905 A1* | 2/2018 | Ashrafi | ................ H04W 16/10 |
| 2019/0132767 A1 | 5/2019 | Shi et al. | |
| 2020/0178198 A1* | 6/2020 | Ding | ..................... H04W 60/04 |

FOREIGN PATENT DOCUMENTS

| | | |
|---|---|---|
| CN | 103718605 A | 4/2014 |
| CN | 107305502 A | 10/2017 |

(Continued)

OTHER PUBLICATIONS

China Patent Office, First Office Action issued Aug. 11, 2022 for application No. CN201910574487.7.
(Continued)

*Primary Examiner* — Ted M Wang
(74) *Attorney, Agent, or Firm* — Li & Cai Intellectual Property (USA) Office

(57) ABSTRACT

Provided are an inter-area media service switching method, a server, a system and a storage medium. A first MEC-CDN node acquires mobile information about a user device from a core network, where the user device establishes a connection with the first MEC-CDN node, and acquires a media service from the first MEC-CDN node; in response to determining, according to the mobile information, that the user device is pre-moved out of a coverage range of the first MEC-CDN node, the first MEC-CDN node determines a second MEC-CDN node and/or a second MEC platform to which the second MEC-CDN node is attached, and establishes a connection with the second MEC-CDN node; the first MEC-CDN node migrates state information about the user device onto the second MEC-CDN node; and in response to determining that the user device enters a cov-
(Continued)

erage area of the second MEC-CDN node, the second MEC-CDN node establishes a connection with the user device, so that the user device acquires the media service from the second MEC-CDN node.

14 Claims, 6 Drawing Sheets

(51) Int. Cl.
  *H04W 36/32* (2009.01)
  *H04W 76/10* (2018.01)
(58) Field of Classification Search
  USPC ..................................................... 455/414.1
  See application file for complete search history.

(56) References Cited

FOREIGN PATENT DOCUMENTS

| CN | 108055680 A | 5/2018 |
|---|---|---|
| CN | 108337691 A | 7/2018 |
| CN | 108886679 A | 11/2018 |
| CN | 109151009 A | 1/2019 |
| CN | 109413194 A | 3/2019 |
| EP | 3209061 A1 | 8/2017 |
| EP | 3355615 A1 | 8/2018 |
| KR | 20180060844 A | 6/2018 |
| WO | 2018041337 A1 | 3/2018 |
| WO | 2019011408 A1 | 1/2019 |

OTHER PUBLICATIONS

WIPO, International Search Report issued on Sep. 2, 2020.
3GPP:"5G enhanced Mobile Broadband; Media Distribution", 3GPP TR 26.891, Mar. 1, 2018.
Huazhang LV, et al., "CDN subsidence scheme for 5g MEC edge cloud", Mobile Communication, Jan. 15, 2019.
3GPP:"Security; Lawful interception requirements", 3GPP TS 33.126, Jan. 24, 2018.
ETSI:"Multi-access edge computing (MEC); phase 2 use cases and requirements", ETSI GS MEC 002, Oct. 31, 2018.
Huazhang LV, et al., "Standardization progress and case analysis of edge computing", Journal of Computer Research and Development, 55(3):487-511, 2018, Mar. 15, 2018.
European Patent Office, The extended European search report issued May 23, 2023 for application No. EP20833614.9.
Korean Patent Office, First Office Action issued May 1, 2024 for application No. KR10-2022-7000596.

\* cited by examiner

INTER-AREA MEDIA SERVICE SWITCHING METHOD, SERVER, SYSTEM, AND STORAGE MEDIUM

The present application is a National Stage of International Application No. PCT/CN2020/094069, filed on Jun. 3, 2020, which claims priority to Chinese Patent Application No. 201910574487.7 filed on Jun. 28, 2019, in Chinese Patent Office, both of which are incorporated by reference herein in their entireties.

TECHNICAL FIELD

The present disclosure relates to, but is not limited to, the field of communication technology.

BACKGROUND

A Content Delivery Network (CDN) has been widely used in internet audio and video transmission, Internet Protocol Television (IPTV) and network media transmission. A core idea of the CDN is to push a content to a service node nearest to a user so that the user can access the content nearby. Using the CDN for media transmission can greatly improve a corresponding speed of acquiring a media content by the user and also greatly reduce a bandwidth pressure of transmitting the media content on a backbone network. At present, all kinds of internet businesses have entered a stage of rapid development, and quality requirements for audios and videos are also constantly improving. In the future, 4K, 8K, multi-perspective and Virtual Reality (VR) videos may be main contents transmitted on the network. In addition, a variety of new businesses, many of which need the CDN to accelerate services, are also constantly launched on the internet. Therefore, the CDN has gradually become an infrastructure for operators.

However, in both wired and wireless networks, due to a demand of a traditional business, edge nodes of the CDN are generally deployed at a higher network level, such as an edge part of the core network, which is suitable for a traditional web page and a request response for a standard definition multimedia content. Future emerging businesses such as 4K, 8K, VR, internet of things, and internet of vehicles have extremely high requirements for responses between terminals and servers, and have put forward high throughput, low latency and Quality of Service (QoS) assurance requirements for service quality. Therefore, service capabilities of traditional CDN edge nodes cannot satisfy the requirements of the new businesses mentioned above.

SUMMARY

According to one aspect of an embodiment of the present disclosure, provided is an inter-area media service switching method, including: acquiring, by a first Mobile-Edge Computing (MEC)-CDN node, mobile information about a user device from a core network; where the user device has established a connection with the first MEC-CDN node, and acquired a media service from the first MEC-CDN node; determining, by the first MEC-CDN node, in response to determining that the user device is pre-moved out of a coverage range of the first MEC-CDN node according to the mobile information, a second MEC-CDN node and/or a second MEC platform to which the second MEC-CDN node is attached, and establishing a connection with the second MEC-CDN node; migrating, by the first MEC-CDN node, state information about the user device onto the second MEC-CDN node; and establishing, by the second MEC-CDN node, in response to determining that the user device enters a coverage area of the second MEC-CDN node, a connection with the user device, to enable the user device to acquire the media service from the second MEC-CDN node.

According to another aspect of the embodiment of the present disclosure, provided is a first MEC-CDN server, including a first processor, a first memory and a first communication bus. The first communication bus is configured to enable a connection communication between the first processor and the first memory; and the first processor is configured to execute one or more first programs stored in the first memory, to implement at least one step performed by the first MEC-CDN node of the above-mentioned inter-area media service switching method.

According to another aspect of the embodiment of the present disclosure, provided is a second MEC-CDN server, including a second processor, a second memory and a second communication bus. The second communication bus is configured to enable a connection communication between the second processor and the second memory; and the second processor is configured to execute one or more second programs stored in the second memory, to implement at least one step performed by the second MEC-CDN node of the above-mentioned inter-area media service switching method.

According to yet another aspect of the embodiment of the present disclosure, provided is a CDN system, including a first MEC-CDN server, a second MEC-CDN server, a core network and a user device. The first MEC-CDN server includes a first MEC-CDN node and a first MEC platform to which the first MEC-CDN node is attached; the second MEC-CDN server includes a second MEC-CDN node and a second MEC platform to which the second MEC-CDN node is attached; the first MEC-CDN server and the second MEC-CDN server have an interworking channel; the first MEC-CDN server acquires mobile information about the user device from the core network; where the user device has established a connection with the first MEC-CDN server, and acquired a media service from the first MEC-CDN server; the first MEC-CDN server determines, in response to determining that the user device is pre-moved out of a coverage range of the first MEC-CDN server according to the mobile information, the second MEC-CDN server, and establishes a connection with the second MEC-CDN server; and the first MEC-CDN server migrates state information about the user device onto the second MEC-CDN server; and the second MEC-CDN server establishes, in response to determining that the user device enters a coverage area of the second MEC-CDN server, a connection with the user device, to enable the user device to acquire the media service from the second MEC-CDN server.

According to yet another aspect of the embodiment of the present disclosure, provided is a storage medium having one or more programs stored thereon, where the one or more programs are capable of being executed by one or more processors to implement at least one step of the above-mentioned inter-area media service switching method.

DETAILED DESCRIPTION

The specific embodiment of the present disclosure will be further described in detail below with reference to the drawings, to make purposes, technical schemes and advantages of the present disclosure clearer. It should be understood that the specific embodiment described herein is only used to explain the present disclosure, and is not intended to limit the present disclosure.

Figure 1:
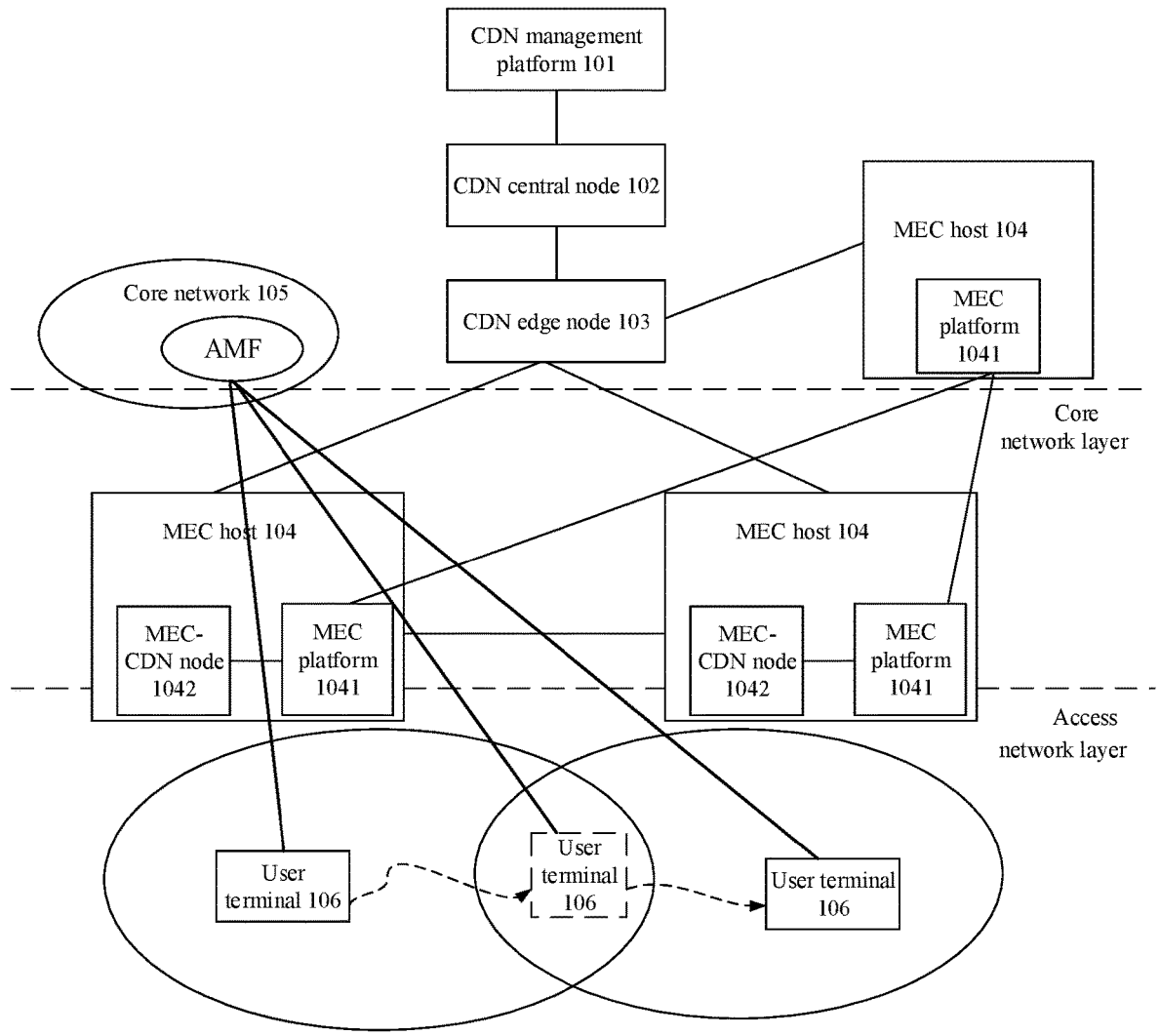
FIG. 1 is a networking diagram of a CDN system including MEC-CDN nodes provided by the embodiment of the present disclosure.

In related art, service capacities of traditional CDN edge nodes cannot satisfy a demand of emerging businesses such as 4K, 8K, VR, internet of things and internet of vehicles in the future. Therefore, it is a common demand of almost all CDN service providers to further sink CDN service nodes. However, the sinking of the CDN service nodes, on one hand, means that a content is closer to a user; and on the other hand, it means that a number of CDN nodes increases and node management becomes more difficult. In a wireless communication network, the much the node sinks, the smaller the service range. Especially in a 5G scenario, a coverage range of a base station is only about 500 meters, and a user device in the wireless network is in a mobile state in most cases, so there is more demand for switching between coverage ranges of multiple nodes than in a wired network. In this case, a current business switching process of wired CDNs cannot guarantee the user's switching experience. In order to solve the above problems, in addition to a traditional CDN central node and an edge node, the embodiment of the present disclosure further provides a CDN edge node based on a MEC platform (i.e., a MEC-CDN node). As shown in FIG. 1, it is a networking diagram of a CDN system including MEC-CDN nodes provided by the embodiment of the present disclosure. The CDN system may include a CDN management platform 101, a CDN central node 102, a CDN edge node 103, an MEC host 104, a core network 105 and user terminals 106. The MEC host 104 includes a MEC platform 1041, and the MEC platform 1041 and the MEC host 104 may have an existing MEC system architecture. A MEC-CDN node 1042 runs on the MEC platform 1041 which loads a main application function of a traditional CDN node (i.e., a CDN Application, CDN APP). In addition, the MEC platform 1041 can also implement a local Domain Name System (or Service) (DNS) protocol resolution, a monitoring analysis function requested by the user, as well as a monitoring domain name configuration function. Further, an important function of the MEC platform 1041 is to guide a media link requested by the user to a local media service node, namely the MEC-CDN node 1042, to provide the user with a localized streaming media service.

It is important to note that the MEC platform 1041 can be deployed in two levels, in addition to being deployed near the base station, the MEC platform 1041 can also be deployed at a core network node, as an MEC management platform, responsible for coordination of lower-level MEC platforms. Of course, there are interworking communication channels between different MEC platforms 1041, which are used to exchange some pieces of business information of the user between different platforms.

According to the embodiment provided by the present disclosure, the MEC-CDN node 1042 may be a virtual node loaded by the MEC platform 1041. The MEC-CDN node 1042 is deployed at an edge of an access network and is closer to the user device than a traditional CDN edge node. The MEC-CDN node 1042 is created/changed/cancelled by requirements of a CDN operation and maintenance system. The MEC-CDN node 1042 may be a complete service node function or a different combination of a specific set of CDN core functions. The MEC-CDN node 1042 may provide a media service for the user device, and further provide a method to quickly respond to switching of the user device between different MEC coverage areas.

Figure 2:
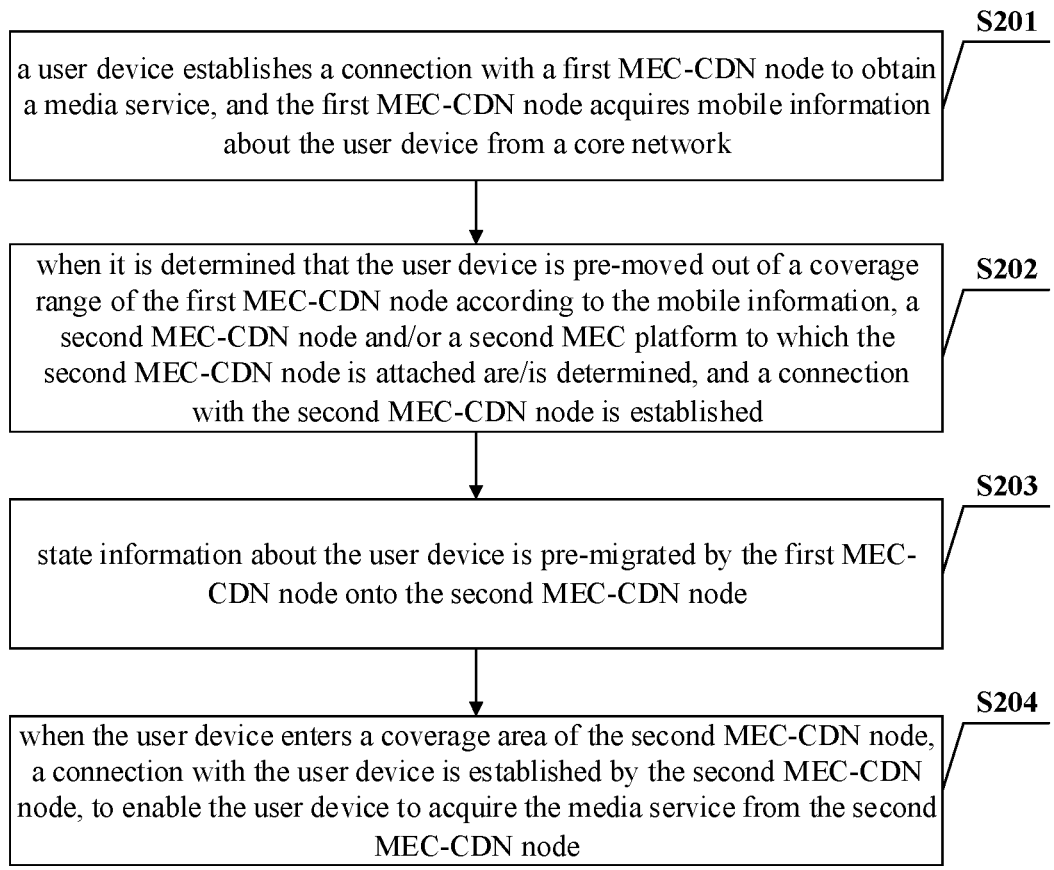
FIG. 2 is a flowchart of an inter-area media service switching method provided by the embodiment of the present disclosure.

As shown in FIG. 2, it is a flowchart of an inter-area media service switching method provided by the embodiment of the present disclosure. The inter-area media service switching method includes steps S201 to S204.

In step S201, the user device establishes a connection with a first MEC-CDN node to obtain a media service, and the first MEC-CDN node acquires mobile information about the user device from a core network.

According to the embodiment provided by the present disclosure, when the user applies for a service to the first MEC-CDN node for the first time, a service process will be referred to traditional service application steps in related technology. The user device establishes the connection with the first MEC-CDN node, and the user device obtains the media service from the first MEC-CDN node, during which a media stream is continuously received by the user device from the first MEC-CDN node. The first MEC-CDN node may subscribe to mobile information of the user device from a 5G core network (5GC), and the mobile information refers to position movement information about the user device. For example, if the user device moves from a position A to a position B, the mobile information is "from A to B". The first MEC-CDN node specifically subscribes to the mobile information form an Access and Mobility Management Functions (AMF) module in the 5GC, and then adjusts and configures the media service of the user device according to the mobile information.

In step S202, when it is determined that the user device is pre-moved out of a coverage range of the first MEC-CDN node according to the mobile information, a second MEC-CDN node and/or a second MEC platform to which the second MEC-CDN node is attached are/is determined, and a connection with the second MEC-CDN node is established.

Figure 3:
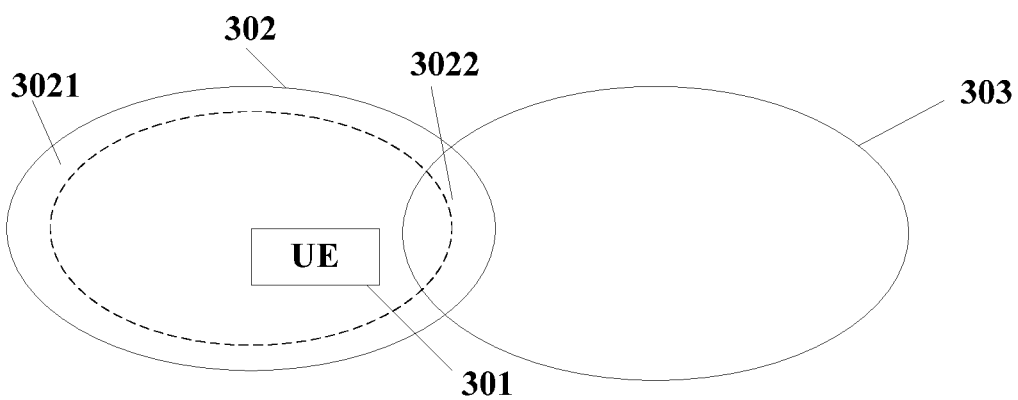
FIG. 3 is a schematic diagram of a user device at a critical position of a service coverage area and/or in an overlapped coverage area by the embodiment of the present disclosure.

According to the embodiment provided by the present disclosure, that the user device is pre-moved out of the coverage range of the first MEC-CDN node may mean that the user device is about to leave the coverage range of the first MEC-CDN node, but is still in the coverage range of the first MEC-CDN node. For example, it is determined that the user device is pre-moved out of the coverage range of the first MEC-CDN node, when the user device is at a critical position of a service coverage area and/or in an overlapped coverage area of the service coverage area of the first MEC-CDN node. As shown in FIG. 3, it is a schematic diagram of the user device at the critical position of the service coverage area and/or in the overlapped coverage area of the service coverage area provided by the embodiment of the present disclosure. If the user device 301 is placed at a critical position 3021 of the service coverage area of the first MEC-CDN node 302, it indicates that the user device 301 will leave the coverage range of the first MEC-CDN node 302; or if the user device 302 is in an overlapped coverage area 3022 between the service coverage area of the first MEC-CDN node 302 and that of another MEC-CDN node 303, it indicates that the user device 302 will enter the coverage range of the other MEC-CDN node 302.

According to the embodiment provided by the present disclosure, when it is determined that the user device is pre-moved out of the coverage range of the first MEC-CDN node, a discovery mechanism for the second MEC-CDN node is activated. Specifically, the MEC management platform may receive the mobile information sent by the first MEC-CDN node and start the discovery mechanism for the second MEC-CDN node. The MEC management platform selects the second MEC-CDN node and/or the second MEC platform according to an interest area of the user device, and the first MEC-CDN node learns about the second MEC-CDN node and/or the second MEC-CDN platform from the MEC management platform. The interest area of the user device includes but is not limited to a service coverage area that the user device is about to enter. For example, as shown in FIG. 3, the user device is about to enter the coverage range of the other MEC-CDN node 303, and the MEC management platform takes the other MEC-CDN node 303 as the second MEC-CDN node. In some exemplary examples, when the service coverage area that the user device is about to enter includes the overlapped coverage area of at least two other MEC-CDN nodes, the MEC management platform may also select one of the at least two other MEC-CDN nodes with fewer amount of connections as the second MEC-CDN node, according to an amount of current connections between each of the at least two other MEC-CDN nodes and other user devices.

According to the embodiment provided by the present disclosure, the second MEC-CDN node and/or the second MEC platform may be determined according to a management strategy configured by a CDN node management platform where the first MEC-CDN node is located. That is, the first MEC-CDN node informs the CDN node management platform of the mobile information, and the CDN node management platform determines the second MEC-CDN node and/or the second MEC-CDN platform according to the mobile terminal and the pre-configured management strategy. The management strategy may select a MEC-CDN node nearest to the first MEC-CDN node according to the mobile information, or select a MEC-CDN node frequently connected by the user according to the mobile information.

According to the embodiment provided by the present disclosure, when it is determined that the user device is pre-moved out of the coverage range of the first MEC-CDN node, the discovery mechanism for the second MEC-CDN node is activated, and when the second MEC platform is determined, further judgment should be made on the second MEC platform to determine whether it has an MEC-CDN node function. Specifically, it is found that there is no MEC-CDN node function on the second MEC platform through interaction the first MEC-CDN node with the MEC management platform, the first MEC-CDN node may request the MEC management platform and/or an MEC choreographer to create the second MEC-CDN node on the second MEC platform through a pre-configured policy. It should be understood that the newly created second MEC-CDN node may not have any application functions or may not have an application function consistent with that of the first MEC-CDN node. In order to ensure the reliability of migrating the connection of the user device from the first MEC-CDN node to the second MEC-CDN node, the first MEC-CDN node may migrate or synchronize its application function and state to the second MEC-CDN node in the process of creating the second MEC-CDN node. The application function of the first MEC-CDN node itself may include but not limited to a CDN service function (e.g., a streaming media service, a Web service, etc.), user status monitoring, and a migration function, etc. The state of the first MEC-CDN node itself may include but not limited to a service state, a connection state and a running state provided by the first MEC-CDN node for the user device.

After the second MEC-CDN node is determined, the connection between the first MEC-CDN node and the second MEC-CDN node is established. The MEC-CDN nodes may communicate with each other based on the MEC-CDN platforms on which the MEC-CDN nodes runs. A communication interface may be a standards-defined interface, such as an interface Mp3 between European Telecommunications Standards Institute (ETSI) MEC platforms.

In step S203, state information about the user device is pre-migrated by the first MEC-CDN node onto the second MEC-CDN node.

According to the embodiment provided by the present disclosure, the first MEC-CDN node pre-migrates the current state information about the user device to the second MEC-CDN node, so that the second MEC-CDN node can be prepared to provide the media service. The state information may include at least one of: a user Identity Document (ID), a media description file, or service state information. The user ID may be ID information of the user device. The media description file may be information about the media received by the user device, including but not limited to a media ID or a Uniform Resource Locator (URL) of a media back source. The service state information may be information about the service provided by the first MEC-CDN node to the user device, such as a progress file in a media video currently provided by the first MEC-CDN node to the user device, or an Internet Protocol (IP) corresponding to the first MEC-CDN node.

Before the second MEC-CDN node establishes the connection with the user device, the second MEC-CDN node prepares for the provision of the media service based on the state information. The second MEC-CDN node pre-establishes a signaling channel, a media data channel, and/or cached media data according to the state information. The signaling channel is established by the second MEC-CDN node in advance to shorten establishment time of the connection between the user device and the second MEC-CDN node. The media data channel is established in advance to shorten acquisition time of the second MEC-CDN node to obtain media data. After the media data channel is established, the media data is cached in advance according to the media ID and the URL of the media back source, so as to shorten response time of the user device to obtain the media data from the second MEC-CDN node.

According to the embodiment provided by the present disclosure, the second MEC-CDN node may be pre-configured with the same IP address as that of the first MEC-CDN node, to enable the user device to quickly establish the connection with the second MEC-CDN node. For example, an IP address of the first MEC-CDN node is IP1 and an IP address of the second MEC-CDN node is IP2, and the user device establishes a session with the first MEC-CDN node to obtain the media service; when the user device switches to the second MEC-CDN node, the user device needs to establish the connection with the second MEC-CDN node through new session establishment information, because the IP address of an object from which the media service to be obtained changes; and when the IP address of the second MEC-CDN node is set to IP1, the object from which the media service is obtained is not change for the user device, such that the user device can quickly reconnected with the second MEC-CDN node through the existing session information. According to the embodiment provided by the present disclosure, a media service function unit may be pre-configured with the same IP address as that of the first MEC-CDN node. The media service function unit is used for providing the media service, which may be a media service function unit of the second MEC-CDN node, or may be a media service function unit of the CDN system where the second MEC-CDN node is located.

In step S204, when the user device enters a coverage area of the second MEC-CDN node, a connection with the user device is established by the second MEC-CDN node, to enable the user device to acquire the media service from the second MEC-CDN node.

According to the embodiment provided by the present disclosure, the second MEC-CDN node is ready to provide the media service. When the user device enters the coverage area of the second MEC-CDN node, the second MEC-CDN node establishes the connection with the user device, through signaling link information between the user device and the first MEC-CDN node. The signaling link information may be copied from the first MEC-CDN node to the second MEC-CDN node through the state information. That the user device enters the coverage area of the second MEC-CDN node does not include that the user device is located in of the overlapped coverage area between the first MEC-CDN node and the second MEC-CDN node. Since the IP address of the second MEC-CDN node is the same as that of the first MEC-CDN node, the second MEC-CDN node may be quickly reconnected with the user device through the existing signaling link information. The signaling link information may include at least one of: a session ID, authentication information, or current media connection information.

According to the embodiment provided by the present disclosure, before the connection with the user device is established by the second MEC-CDN node, when it is determined that the second MEC-CDN node does not have a same media segment as the first MEC-CDN node according to the state information, the second MEC-CDN node acquires the media segment from the first MEC-CDN node or the media back source in advance. The media segment may be a progress file segment related to the current playing of the media by the user device. As the second MEC-CDN node pre-caches the media data, it is determined whether the cached media data includes the same media segment as the first MEC-CDN node. If the same media segment exists, the second MEC-CDN node provides the continuous media service for the user device after the connection is established; and if the second MEC-CDN node does not have the same media segment as the first MEC-CDN node, the second MEC-CDN node may obtain the media segment from the media source. The media source may be a traditional edge node in the core network or a media URL. The second MEC-CDN node may further obtain the media segment from the first MEC-CDN node. The first MEC-CDN node may push the media segment to the second MEC-CDN node, or the second MEC-CDN node may pull the media segment from the first MEC-CDN node to the local.

According to the embodiment provided by the present disclosure, when the second MEC-CDN node establishes the connection with the user device, the second MEC-CDN node pushes the media segment to the user device so that the user device can receive the continuous media service; and at the same time, the first MEC-CDN node releases the connection with the user device. The second MEC-CDN node pre-copies the state information of the first MEC-CDN node, establishes the signaling channel and the media data channel in advance, and caches same media data, so that the user device can quickly switch the service between different MEC coverage areas in real time.

According to the embodiment provided by the present disclosure, when migration time taken for migrating the state information of the user device from the first MEC-CDN node to the second MEC-CDN node is greater than a pre-set time threshold, the second MEC-CDN node restarts a Transmission Control Protocol (TCP) connection with the user device. That is, when the migration time is greater than the pre-set time threshold, the second MEC-CDN node is connected to the user device in a traditional connection mode. The user device needs to disconnect from the first MEC-CDN node and re-establish the TCP connection with the second MEC-CDN node. The pre-set time threshold may be flexibly set according to a number of user devices currently connected to the second MEC-CDN node. For example, if the number of the user devices currently connected to the second MEC-CDN node is small, the pre-set time threshold may be 3 s to 10 s.

According to the inter-area media service switching method provided by the embodiment of the present disclosure, when the user device moves in the coverage area of the first MEC-CDN node, the first MEC-CDN node obtains the mobile information of the user from the wireless core network; when it is determined by the first MEC-CDN node that the user device is about to move out of the coverage range of the present node, the first MEC-CDN node searches the adjacent second MEC-CDN node, and sends the state information about the user device to the second MEC-CDN node through a platform communication channel; the second MEC-CDN node is prepared to provide the media service in advance; when the user completely moves out of the coverage range of the first MEC-CDN node and moves into the coverage range of the second MEC-CDN node, the existing session information is used for the media link with the new second MEC-CDN node; and the second MEC-CDN node pushes the cached media service to the user device, enabling the user to quickly switch between different MEC coverage areas when consuming a video service, so as to achieve less switching delay and improve user experience.

Figure 4:
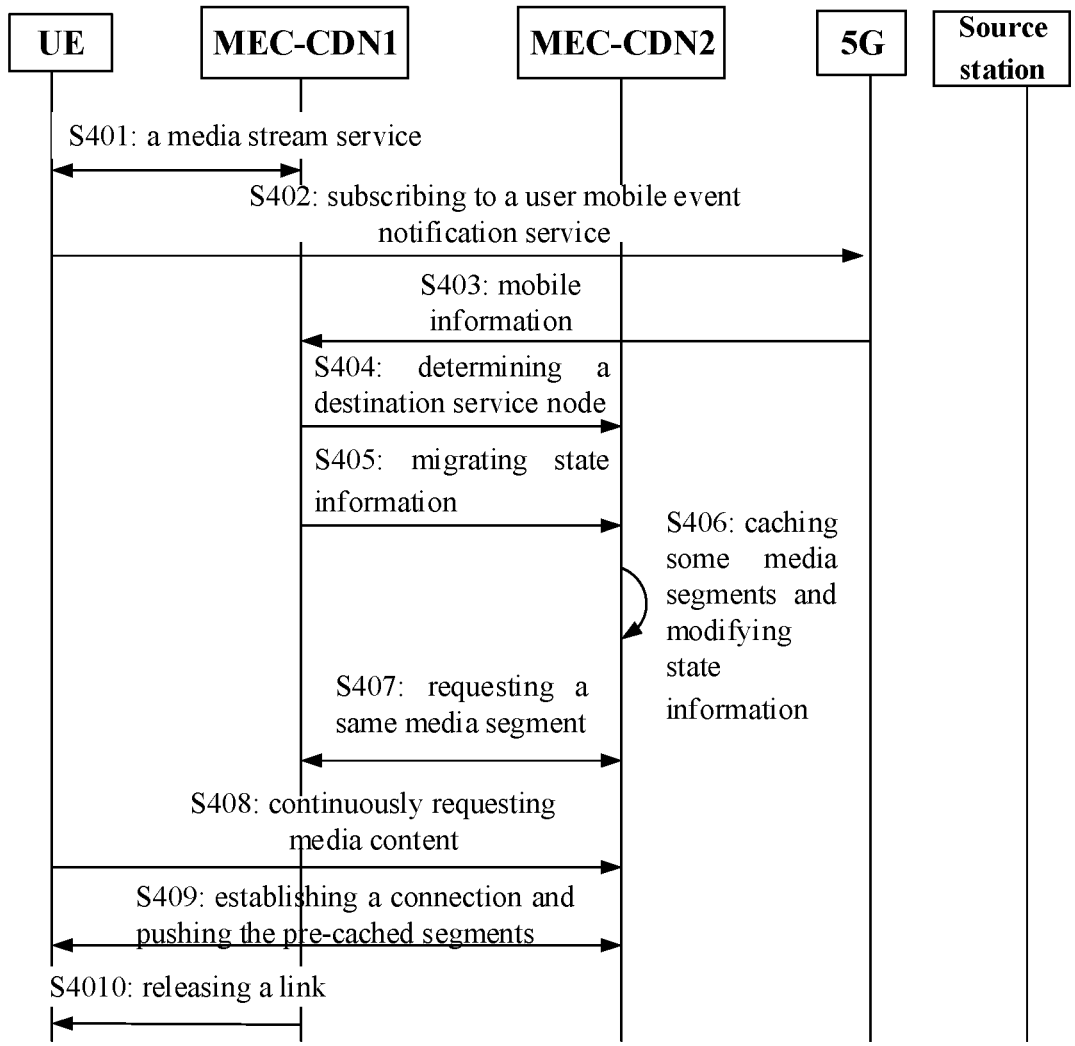
FIG. 4 is another flowchart of an inter-area media service switching method provided by the embodiment of the present disclosure.

As shown in FIG. 4, it is another flowchart of an inter-area media service switching method provided by the embodiment of the present disclosure. The inter-area media service switching method may include steps S401 to S4010.

In step S401, the user device connects to an MEC-CDN1 node and accepts a local media stream service.

In step S402, the MEC-CDN1 node subscribes to a user mobile event notification service provided by an AMF in a wireless core network.

In step S403, the AMF in the wireless core network obtains mobile information of the user device and sends the mobile information to the MEC-CDN1 node.

The mobile information may include position movement information about the user device. When the AMF learns the position movement of the user device and determines that the user device is at a critical position of a service coverage area of the MEC-CDN1 node and/or in an overlapped coverage area between the MEC-CDN1 node and another MEC-CDN node, the mobile information will be sent to the MEC-CDN1 node.

In step S404, after receiving the mobile information, the MEC-CDN1 node determines that a destination service node of the user device is an MEC-CDN2 node.

The MEC-CDN1 node will feedback the mobile information to an MEC management platform after receiving the mobile information, and an MEC management layer will determine the next MEC-CDN2 that the user device will access, according to the mobile information and an interest area of the user device. The MEC-CDN1 node may also inform a Global Server Load Balance (GSLB) system in the CDN system to select the nearest MEC-CDN2 based on the mobile information of the user device. Of course, the two methods may be combined for a comprehensive analysis by the MEC-CDN1 to determine the MEC-CDN2 closest to the MEC-CDN1 node and consistent with the interest area of the user device.

In step S405, an MEC platform of the MEC-CDN1 communicates with an MEC platform of the MEC-CDN2, and the state information about the user device's service on the MEC-CDN1 is migrated.

It can be understood that the MEC-CDN may be a virtual node running on the MEC platform. The MEC nodes may communicate with each other through a standard-defined communication interface, such as an interface Mp3 between ETSI MEC platforms. The MEC-CDN1 migrates/copies the state information about the user device to the MEC-CDN2; and the state information may include but is not limited to a user name, a media ID, a URL of a media back source, and/or service state information. At this point, user's media data is still provided by the MEC-CDN1.

In step S406, the MEC-CDN2 pre-launches a link with the media source according to the state information, caches some media segments, and modifies service state information of the MEC-CDN2.

According to the embodiment provided by the present disclosure, since the state information includes the media ID, the URL of the media back source and other related media description files, the MEC-CDN2 may establish the media data channel with the media source in advance to cache some media segments. Meanwhile, the MEC-CDN2 configures its own IP address to be the same as that of the MEC-CDN1, so that the MEC-CDN2 can establish a connection with the user device based on signaling link information between the user device and the MEC-CDN1.

In step S407, when the MEC-CDN2 does not have a same media segment as the MEC-CDN1, the MEC-CDN2 requests the same media segment from the MEC-CDN1.

The MEC-CDN2 detects the media source and media service parameters of the cached media segment; and when it is determined that there is no the same media segment as the MEC-CDN1, the MEC-CDN2 requests the same media segment from the MEC-CDN1. The same media segment refers to a progress file segment related to the media currently played by the user.

In step S408, after the user device is completely moved to a coverage area of the MEC-CDN2, the media content is continuously requested.

In step S409, the MEC-CDN2 establishes the connection with the user device and pushes the pre-cached segments to the user device in response to the user's request.

Since the IP address of the MEC-CDN2 is configured to be the same as that of the MEC-CDN1, the MEC-CDN2 may be quickly reconnected with the user device through the existing signaling link information. The signaling link information may include, and is not limited to a session ID, authentication information, and/or current media connection information.

When the MEC-CDN2 requests the media content, the request of the user device is directed to the MEC-CDN2, and then the MEC-CDN2 pushes the media segments to the user device to ensure that the user device receives the continuous media service.

In step S4010, the user continuously receives a media stream from the MEC-CDN2, and the MEC-CDN1 releases a link resource with the user.

According to the inter-area media service switching method provided by the embodiment of the present disclosure, the user device first establishes the connection with the MEC-CDN1 in an area 1 to obtain the media service. When the user is about to move from the area 1 to an area 2, the MEC-CDN1 obtains the mobile information of the user device from the wireless core network, and communicates with the next MEC-CDN2 in advance to migrate the state information of the user device. The MEC-CDN2 pre-caches the media data; and when the same media segment as the MEC-CDN1 is not available, it can also be obtained in advance from the MEC-CDN1 or from a source station. When the user device moves to the area 2, existing session information is used to connect to the MEC-CDN2. When the MEC-CDN2 is preconfigured with the same IP address as the MEC-CDN1, the existing session information may be used to quickly reconnect and disconnect the user device from the MEC-CDN1 in the area 1. Therefore, for the mobile user device, the real-time service can be quickly switched, and the response time of the user device's request can be reduced through pre-caching the media segments.

Figure 5:
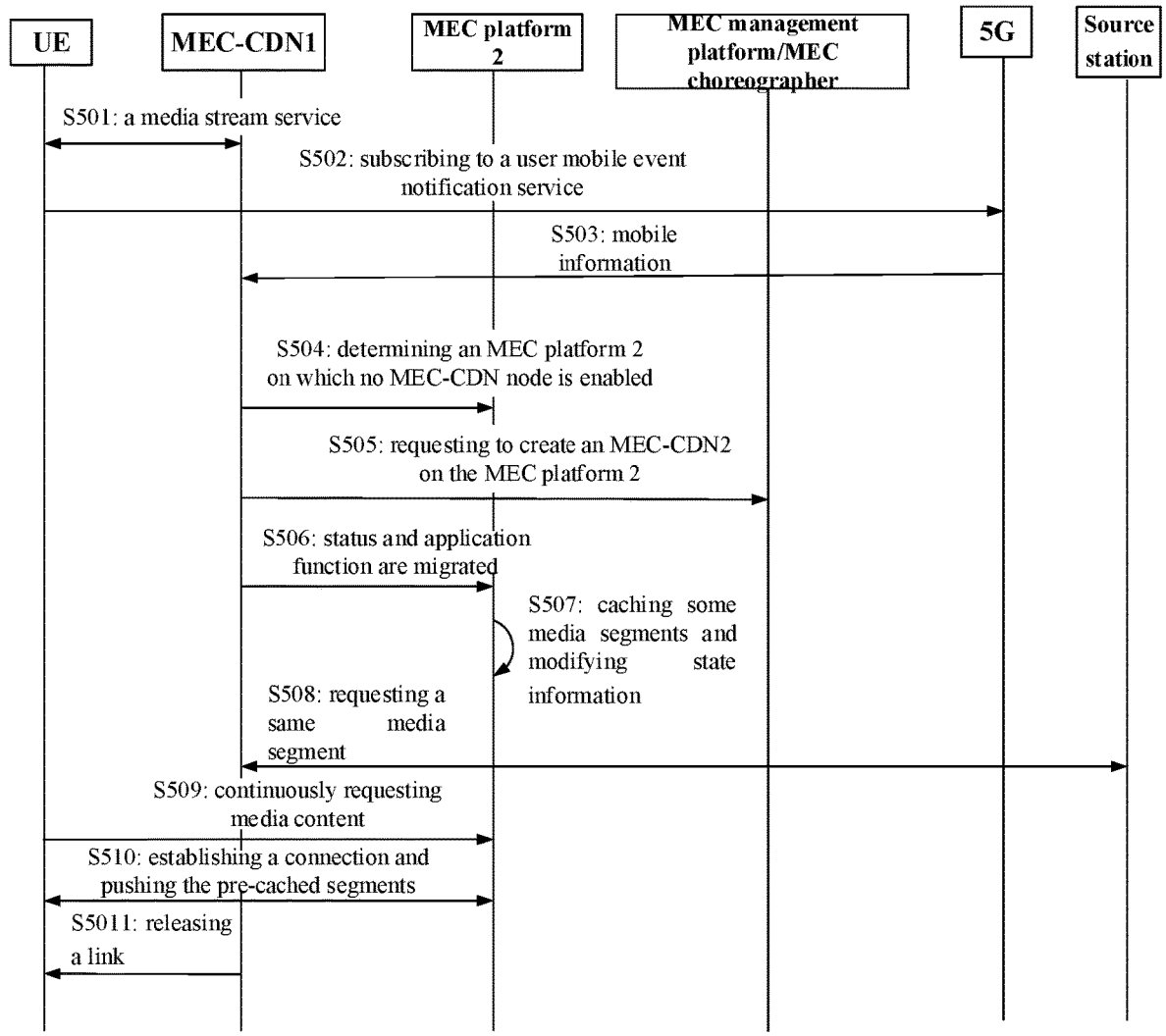
FIG. 5 is another flowchart of an inter-area media service switching method provided by the embodiment of the present disclosure.

As shown in FIG. 5, it is another flowchart of an inter-area media service switching method provided by the embodiment of the present disclosure. The inter-area media service switching method may include steps S501 to S5011.

In step S501, the user device connects to the MEC-CDN1 node and accepts the local media stream service.

In step S502, the MEC-CDN1 node subscribes to the user mobile event notification service provided by the AMF in the wireless core network.

In step S503, when the AMF of the wireless core network obtains the mobile information of the user device, the mobile information is sent to the MEC-CDN1 node.

The mobile information may include position movement information about the user device. When the AMF learns the position movement of the user device and determines that the user device is at the critical position of the service coverage area of the MEC-CDN1 node and/or in the overlapped coverage area between the MEC-CDN1 node and the other MEC-CDN node, the mobile information will be sent to the MEC-CDN1 node.

In step S504, after receiving the mobile information, the MEC-CDN1 node determines that the destination service node of the user device is an MEC platform 2, and the MEC platform 2 feedbacks that an MEC-CDN node function is not enabled. That is, there is no MEC-CDN node on the MEC platform 2.

In step S505, after receiving the feedback, the MEC-CDN1 sends a business request to the MEC management platform and/or the MEC choreographer, to request to create the MEC-CDN2 on the MEC platform 2.

In step S506, an MEC platform 1 of the MEC-CDN1 communicates with the MEC platform 2, and the state information about the user device's service on the MEC-CDN1 and a CDN node function of the MEC-CDN1 itself are migrated.

It can be understood that the MEC-CDN may be the virtual node running on the MEC platform. The MEC platforms can communicate with each other through the standard-defined communication interface, such as the interface Mp3 between the ETSI MEC platforms. Then the MEC-CDN1 migrates/copies the state information about the user device to the MEC-CDN2. The state information may include but is not limited to the user name, the media ID, the URL of the media back source, and/or the service state information. At this point, the user's media data is still provided by the MEC-CDN1. Further, the MEC-CDN1 may choose to synchronically migrate/copy its own CDN node function and state to the MEC-CDN2.

In step S507, the MEC-CDN2 pre-launches the link with the media source according to the state information, caches some media segments, and modifies the service state information of the MEC-CDN2.

According to the embodiment provided by the present disclosure, since the state information includes the media ID, the URL of the media back source and other related media description files, the MEC-CDN2 may establish the media data channel with the media source in advance, and cache some media segments. Meanwhile, the MEC-CDN2 configures its own IP address to be the same as that of the MEC-CDN1, so that the MEC-CDN2 can establish the connection with the user device based on the signaling link information between the user device and the MEC-CDN1.

In step S508, when the MEC-CDN2 does not have the same media segment as the MEC-CDN1, the same media segment is requested from the source station.

The MEC-CDN2 detects the media source and the media service parameters of the cached media segment, and determines that there is no the same media segment as the MEC-CDN1, the MEC-CDN2 requests the same media segment from the source station. The same media segment may refer to the progress file segment related to the media currently played by the user. The source station may be a traditional edge node of the core network.

In step S509, after the user device is completely moved to a coverage area of the MEC-CDN2, the media content is continuously requested.

In step S5010, the MEC-CDN2 establishes the connection with the user device and pushes the pre-cached segments to the user device in response to the user's request.

Since the IP address of the MEC-CDN2 is configured to be the same as that of the MEC-CDN1, the MEC-CDN2 may be quickly reconnected with the user device through the existing signaling link information. The signaling link information may include, and is not limited to the session ID, the authentication information, and/or the current media connection information.

When the MEC-CDN2 requests the media content, the request of the user device is directed to the MEC-CDN2, and then the MEC-CDN2 pushes the media segments to the user device to ensure that the user device receives the continuous media service.

In step S5011, the user continuously receives the media stream from the MEC-CDN2, and the MEC-CDN1 releases the link resource with the user.

According to the inter-area media service switching method provided by the embodiment of the present disclosure, the user device first establishes the connection with the MEC-CDN1 in the area 1 to obtain the media service. When the user is about to move from the area 1 to the area 2, the MEC-CDN1 obtains the mobile information of the user device from the wireless core network, the MEC-CDN platform 2 is determined, and the MEC-CDN node 2 (i.e., the MEC-CDN2) is created through the MEC-CDN management platform when the MEC-CDN node does not exist on the MEC-CDN platform 2. The MEC-CDN1 communicates with the MEC-CDN2 in advance, and migrates the state information about the user device. The MEC-CDN2 pre-caches the media data; and when the same media segment as the MEC-CDN1 is not available, it can also be obtained in advance from the MEC-CDN1 or from the source station. When the user device moves to the area 2, the existing session information is used to connect to the MEC-CDN2. When the MEC-CDN2 is preconfigured with the same IP address as the MEC-CDN1, the existing session information may be used to quickly reconnect and disconnect the user device from the MEC-CDN1 in the area 1. Therefore, for the mobile user device, the real-time service can be quickly switched, and the response time of the user device's request can be reduced through pre-caching the media segments.

Figure 6:
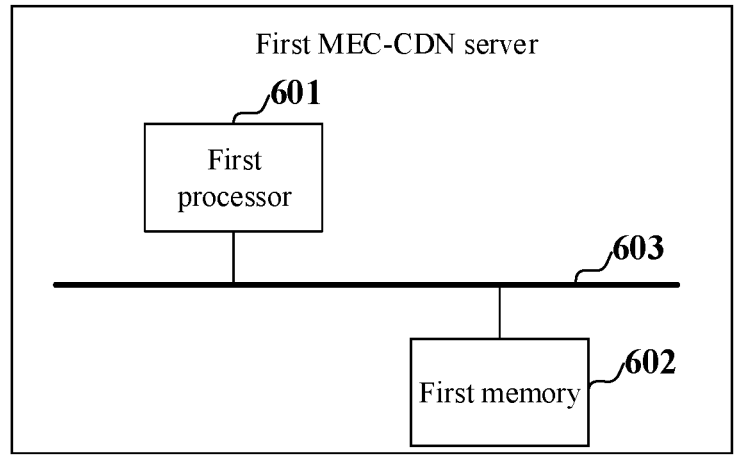
FIG. 6 is a schematic diagram of a structure of an MEC-CDN server provided by the embodiment of the present disclosure.

The embodiment of the present disclosure further provides an MEC-CDN server, as shown in FIG. 6, which is a schematic diagram of a structure of an MEC-CDN server provided by the embodiment of the present disclosure. A first MEC-CDN server 60 includes a first processor 601, a first memory 602 and a first communication bus 603. The first communication bus 603 is configured to enable a connection communication between the first processor 601 and the first memory 602. The first processor 601 is configured to execute one or more programs stored in the first memory 602, to implement at least one step performed by the first MEC-CDN node of the above-mentioned inter-area media service switching method.

Figure 7:
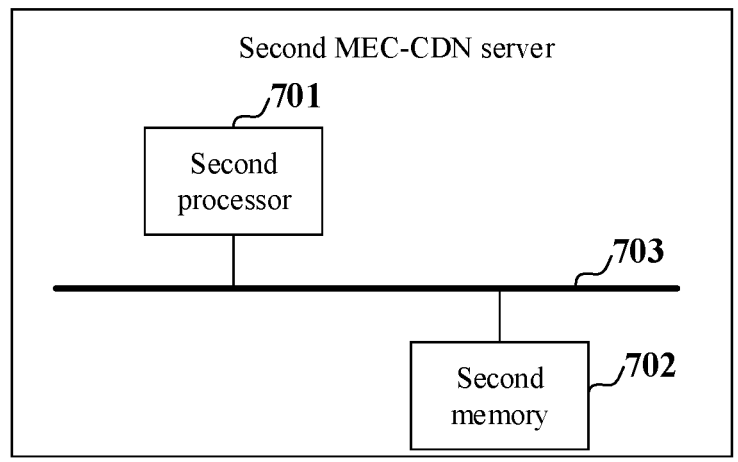
FIG. 7 is a schematic diagram of a structure of another MEC-CDN server provided by the embodiment of the present disclosure.

The embodiment of the present disclosure further provides another second MEC-CDN server, as shown in FIG. 7, which is a schematic diagram of a structure of another MEC-CDN server provided by the embodiment of the present disclosure. A second MEC-CDN server 70 includes a second processor 701, a second memory 702 and a second communication bus 703. The second communication bus 703 is configured to enable a connection communication between the second processor 701 and the second memory 702. The second processor 701 is configured to execute one or more programs stored in the second memory 702, to implement at least one step performed by the second MEC-CDN node of the above-mentioned inter-area media service switching method.

Figure 8:
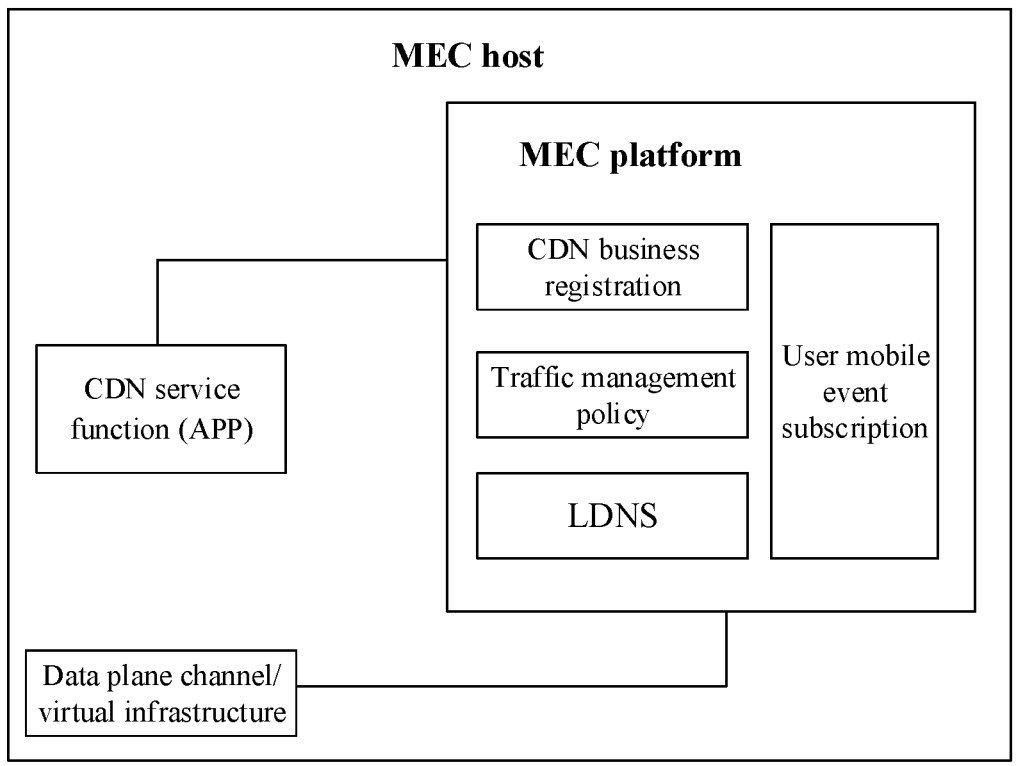
FIG. 8 is a schematic diagram of a functional architecture of an MEC-CDN node provided by the embodiment of the present disclosure.

As shown in FIG. 8, it is a schematic diagram of a functional architecture of an MEC-CDN node provided by the embodiment of the present disclosure. A main logical function of the virtual MEC-CDN node is mainly composed of software running on one or more Virtual machines (VMs). The MEC-CDN node may be further divided into two subsystems, which respectively are a business management subsystem function and media service function based on an MEC edge server. The business management subsystem subscribes to the mobile information of the user from the 5GC (which is the AMF module in the 5GC further), and adjusts and configures the CDN media service function according to this information. The media service function provides the media service for the user device. The media service function may be a virtual or physical node, which is controlled by the business management subsystem.

A function based on the MEC-CDN may mainly include but is not limited to: a storage/caching function, a streaming media service function, a business management function, and/or a load balancing function. A node APP of the MEC-CDN runs on the MEC platform, and other applications may also be deployed on the platform. According to the embodiment provided by the present disclosure, for a CDN service, the MEC platform needs to be deployed with capabilities such as a CDN business registration capability, a traffic management policy, and/or a local DNS (LDNS) capability. The MEC platform also needs to be deployed with a user mobility event subscription monitoring function which is specifically used to subscribe to information from the AMF module in the 5GC, and a user device state migration function. The MEC platform guides the media link requested by the user to a local media service MEC-CDN node to provide the localized streaming media service for the user.

It can be understood that the MEC host and MEC platform shown in FIG. 8 are existing technologies and comply with the definition of ETSI MEC specification. The data plane channel/virtual infrastructure shown in FIG. 8 is the capability of the existing MEC itself, which will not be repeated herein. A hardware structure of the above-mentioned MEC-CDN server may be the MEC host.

Figure 9:
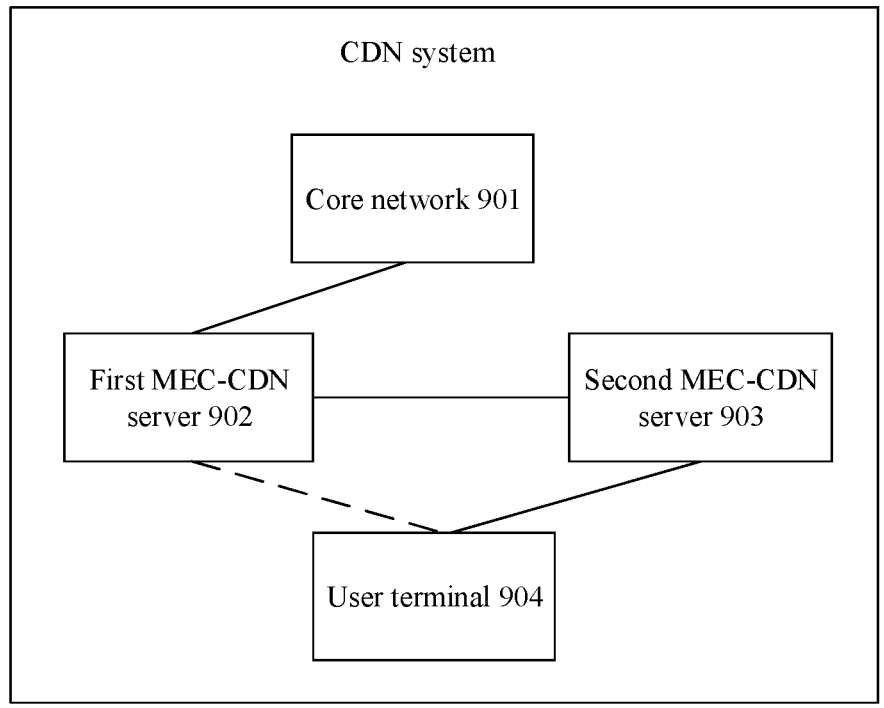
FIG. 9 is a schematic diagram of a structure of a CDN system provided by the embodiment of the present disclosure.

As shown in FIG. 9, it is a schematic diagram of a structure of a CDN system provided by the embodiment of the present disclosure. The CDN system at least includes: a first MEC-CDN server 902, a second MEC-CDN server 903, a core network 901 and a user terminal (or a user device) 904. It should be understood that any one MEC-CDN server may include an MEC-CDN node and an MEC platform to which the MEC-CDN node is attached.

The first MEC-CDN server 902 and the second MEC-CDN server 903 have an interworking channel.

The user terminal 904 establishes a connection with the first MEC-CDN server 902 to acquire the media service, and the first MEC-CDN server 902 acquires mobile information about the user terminal 904 from the core network 901.

When it is determined by the first MEC-CDN server 902 that the user terminal 904 is pre-moved out of a coverage range of the first MEC-CDN server 902 according to the mobile information, the first MEC-CDN server 902 determines the second MEC-CDN server 903, and establishes a connection with the second MEC-CDN server 903.

The first MEC-CDN server 902 migrates state information about the user terminal 904 onto the second MEC-CDN server 903.

When the user terminal 904 enters a coverage area of the second MEC-CDN server 903, the second MEC-CDN server 903 establishes a connection with the user terminal 904, to enable the user terminal 904 to acquire the media service from the second MEC-CDN server 903.

The CDN system provided by the embodiment of the present disclosure may include a management system and a distribution system. The management system is responsible for managing status of nodes, and/or configuring the nodes, etc. The management system may also generate an additional 5G AMF function, and copy some pre-configured management policies to the MEC nodes. The distribution system may be divided into a storage node and a GSLB system. The GSLB is responsible for load balancing and selects the nearest MEC-CDN node for the user device. The storage node may include a traditional Point of Presence (POP) or a cache node, and an MEC-CDN node. The traditional POP node deploys an edge node of a physical node in an edge part of the core network, according to an existing deployment manner. The MEC-CDN node may be a virtualization node, loaded by the MEC server and deployed at the edge of the access network, such as a base station (BS) or a base band unit (BBU).

The embodiment of the present disclosure further provides a storage medium including volatile or non-volatile, removable or non-removable medium implemented in any method or technology for storage of information (such as a computer-readable instruction, a data structure, a computer program module or other data). The storage medium include, but is not limited to, RAM (Random Access Memory), ROM (Read-Only Memory), EEPROM (Electrically Erasable Programmable Read Only Memory), flash memory or other memory technology, CD-ROM (Compact disk Read-Only Memory), Digital Versatile Disks (DVD) or other optical disk storage, magnetic cassette, magnetic tape, magnetic disk storage or other magnetic storage devices, or any other medium which can be used to store desired information and which can be accessed by a computer.

The storage medium provided by the embodiment of the present disclosure may be configured to store one or more computer programs, which are capable of being executed by one or more processors, to implement at least one step of the above-mentioned inter-area media service switching method.

It will be apparent to those having ordinary skill in the art that all or some of the steps of the methods, functional modules/units in the systems and apparatus disclosed above may be implemented as software (which may be implemented as a computer program code executable by a computing device), firmware, hardware, and suitable combinations thereof. In a hardware implementation, division between the functional modules/units mentioned in the above description does not necessarily correspond to division of physical components. For example, one physical component may have multiple functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit.

In addition, as is well known to those having ordinary skill in the art, communication medium typically embodies a computer-readable instruction, a data structure, a computer program module or other data in a modulated data signal such as a carrier wave or other transport mechanism and includes any information delivery medium. Thus, the present disclosure is not limited to any specific combination of hardware and software.

The foregoing contents are detailed descriptions of the embodiment of the present disclosure, taken in conjunction with the specific implements thereof, and it is not intended that the present disclosure be limited to the descriptions. For those having ordinary skill in the technical field to which the present disclosure belongs, without departing from the invention concept of the present disclosure, several simple deductions or substitutions can be made, which should be regarded as falling within the protection scope of the present disclosure.

What is claimed is:

1. An inter-area media service switching method, comprising:
acquiring, by a first Mobile-Edge Computing (MEC)-Content Delivery Network (CDN) node, mobile information about a user device from a core network; wherein the user device establishes a connection with the first MEC-CDN node, and acquires a media service from the first MEC-CDN node;
determining, by the first MEC-CDN node, in response to determining that the user device is pre-moved out of a coverage range of the first MEC-CDN node according to the mobile information, a second MEC-CDN node and/or a second MEC platform to which the second MEC-CDN node is attached, and establishing a connection with the second MEC-CDN node;
migrating, by the first MEC-CDN node, state information about the user device onto the second MEC-CDN node; and
establishing, by the second MEC-CDN node, in response to determining that the user device enters a coverage area of the second MEC-CDN node, a connection with the user device, to enable the user device to acquire the media service from the second MEC-CDN node;
wherein determining the second MEC-CDN node and/or the second MEC platform, comprises:
selecting, by an MEC management platform, the second MEC-CDN node and/or the second MEC platform according to an interest area of the user device, and acquiring, by the first MEC-CDN node, information about the second MEC-CDN node and/or the second MEC platform from the MEC management platform; and/or
determining, by the first MEC-CDN node, the second MEC-CDN node and/or the second MEC platform, according to a management strategy configured by a CDN node management platform where the first MEC-CDN node is located.

2. The inter-area media service switching method of claim 1, wherein determining, by the first MEC-CDN node, that the user device is pre-moved out of the coverage range of the first MEC-CDN node according to the mobile information, comprises:
determining, by the first MEC-CDN node, that the user device is pre-moved out of the coverage range of the first MEC-CDN node, in response to determining that the user device is at a critical position of a service coverage area of the first MEC-CDN node and/or in an overlapped coverage area between the first MEC-CDN node and another node.

3. The inter-area media service switching method of claim 1, before migrating, by the first MEC-CDN node, the state information about the user device onto the second MEC-CDN node, further comprising:
requesting, by the first MEC-CDN node, creation of the second MEC-CDN node on the second MEC platform through the MEC management platform and/or an MEC choreographer, in response to determining that there is no second MEC-CDN node existing on the second MEC platform; and
migrating, by the first MEC-CDN node, an application and a state of the first MEC-CDN node onto the second MEC-CDN node.

4. The inter-area media service switching method of claim 1, wherein the state information about the user device comprises at least one of: a user identity document, a media description file, or service state information.

5. The inter-area media service switching method of claim 4, before establishing, by the second MEC-CDN node, the connection with the user device, further comprising:
establishing, by the second MEC-CDN node, a signaling channel, a media data channel, and/or cached media data according to the state information about the user device.

6. The inter-area media service switching method of claim 5, before establishing, by the second MEC-CDN node, the connection with the user device, further comprising:
the second MEC-CDN node and/or a media service function unit are configured with a same internet protocol as the first MEC-CDN node.

7. The inter-area media service switching method of claim 6, wherein establishing, by the second MEC-CDN node, the connection with the user device, comprises:
establishing, by the second MEC-CDN node, the connection with the user device, based on signaling link information between the user device and the first MEC-CDN node;
wherein the signaling link information comprises at least one of: a session identification, authentication information, or current media connection information.

8. The inter-area media service switching method of claim 1, before establishing, by the second MEC-CDN node, the connection with the user device, further comprising:
acquiring, by the second MEC-CDN node, in response to determining that the second MEC-CDN node does not have a same media segment as the first MEC-CDN node according to the state information about the user device, the same media segment from the first MEC-CDN node or a media back source.

9. The inter-area media service switching method of claim 8, further comprising:
establishing, by the second MEC-CDN node, the connection with the user device based on a transmission control protocol, in response to determining that migration time taken for migrating the state information about the user device from the first MEC-CDN node to the second MEC-CDN node is greater than a pre-set time threshold.

10. A first MEC-CDN server, comprising a first processor, a first memory and a first communication bus, wherein:
the first communication bus is configured to enable a connection communication between the first processor and the first memory; and
the first processor is configured to execute one or more first programs stored in the first memory, to implement at least one step performed by the first MEC-CDN node of the inter-area media service switching method of claim 1.

11. The first MEC-CDN server of claim 10, wherein the first processor is configured to execute the one or more first programs stored in the first memory to implement:
determining that the user device is pre-moved out of the coverage range of the first MEC-CDN node, in response to determining that the user device is at a critical position of a service coverage area of the first MEC-CDN node and/or in an overlapped coverage area between the first MEC-CDN node and another node.

12. A non-transitory computer-readable storage medium having one or more programs stored thereon, wherein the one or more programs are capable of being executed by one or more processors to implement at least one step performed by the first MEC-CDN node of the inter-area media service switching method of claim 1.

13. An inter-area media service switching method, comprising:
- acquiring, by a first Mobile-Edge Computing (MEC)-Content Delivery Network (CDN) node, mobile information about a user device from a core network; wherein the user device establishes a connection with the first MEC-CDN node, and acquires a media service from the first MEC-CDN node;
- determining, by the first MEC-CDN node, in response to determining that the user device is pre-moved out of a coverage range of the first MEC-CDN node according to the mobile information, a second MEC-CDN node and/or a second MEC platform to which the second MEC-CDN node is attached, and establishing a connection with the second MEC-CDN node;
- migrating, by the first MEC-CDN node, state information about the user device onto the second MEC-CDN node; and
- establishing, by the second MEC-CDN node, in response to determining that the user device enters a coverage area of the second MEC-CDN node, a connection with the user device, to enable the user device to acquire the media service from the second MEC-CDN node;
- wherein determining, by the first MEC-CDN node, that the user device is pre-moved out of the coverage range of the first MEC-CDN node according to the mobile information, comprises:
- determining, by the first MEC-CDN node, that the user device is pre-moved out of the coverage range of the first MEC-CDN node, in response to determining that the user device is at a critical position of a service coverage area of the first MEC-CDN node and/or in an overlapped coverage area between the first MEC-CDN node and another node.

14. An inter-area media service switching method, comprising:
- acquiring, by a first Mobile-Edge Computing (MEC)-Content Delivery Network (CDN) node, mobile information about a user device from a core network; wherein the user device establishes a connection with the first MEC-CDN node, and acquires a media service from the first MEC-CDN node;
- determining, by the first MEC-CDN node, in response to determining that the user device is pre-moved out of a coverage range of the first MEC-CDN node according to the mobile information, a second MEC-CDN node and/or a second MEC platform to which the second MEC-CDN node is attached, and establishing a connection with the second MEC-CDN node;
- migrating, by the first MEC-CDN node, state information about the user device onto the second MEC-CDN node; and
- establishing, by the second MEC-CDN node, in response to determining that the user device enters a coverage area of the second MEC-CDN node, a connection with the user device, to enable the user device to acquire the media service from the second MEC-CDN node;
- wherein the state information about the user device comprises at least one of: a user identity document, a media description file, or service state information;
- before establishing, by the second MEC-CDN node, the connection with the user device, the method further comprises:
- establishing, by the second MEC-CDN node, a signaling channel, a media data channel, and/or cached media data according to the state information about the user device.

* * * * *